US012721299B2

(12) United States Patent
Durack et al.

(10) Patent No.: US 12,721,299 B2
(45) Date of Patent: Sep. 1, 2026

(54) DEVICES, METHODS AND SYSTEMS FOR RESTRAINING, TRANSPORTING AND MANIPULATING ANIMALS

(71) Applicant: Fast-Sexing Technologies ULC, Navasota, TX (US)

(72) Inventors: Gary Durack, Urbana, IL (US); Brian Reed, Bondville, IL (US)

(73) Assignee: Inguran, LLC, Navasota, TX (US)

( * ) Notice: Subject to any disclaimer, the term of this patent is extended or adjusted under 35 U.S.C. 154(b) by 219 days.

(21) Appl. No.: 18/083,289

(22) Filed: Dec. 16, 2022

(65) Prior Publication Data

US 2023/0189752 A1 Jun. 22, 2023

Related U.S. Application Data

(60) Provisional application No. 63/290,951, filed on Dec. 17, 2021.

(51) Int. Cl.
*A01K 1/00* (2006.01)

(52) U.S. Cl.
CPC .................................. *A01K 1/0035* (2013.01)

(58) Field of Classification Search
CPC ...... A01K 1/0035; A01K 1/0245; A01K 1/03; A01K 1/033; A01K 1/034; A01K 29/00; B66F 3/00; B66F 5/00; B66F 7/22; B66F 11/00; B66F 7/02; B66F 9/02; B66F 9/16; B66F 9/125; A22B 5/06; A22C 15/00
USPC ............................ 119/453; 269/17; 452/187
See application file for complete search history.

(56) References Cited

U.S. PATENT DOCUMENTS 1,234,733 A 7/1917 Corington
2,990,174 A * 6/1961 Kimbrough ............ B65H 29/60 271/294
3,385,401 A * 5/1968 Campbell ................ B66F 9/06 187/244
3,541,888 A 11/1970 Hegar
3,998,345 A * 12/1976 Fiehler ...................... B66F 9/16 414/641
4,599,034 A * 7/1986 Kennedy ................... B66F 7/22 254/89 R
4,829,937 A * 5/1989 Weelink ................ A01K 15/04 119/727
5,015,146 A * 5/1991 Barnes ...................... B66F 7/22 414/628
5,299,658 A 4/1994 Cox et al.
5,383,425 A 1/1995 Bleacher
(Continued)

FOREIGN PATENT DOCUMENTS

AU 2006235761 B1 3/2007
CN 109607434 A * 4/2019 ............. B66F 11/00
(Continued)

*Primary Examiner* — Kimberly S Berona
*Assistant Examiner* — Erica Michelle Huebner
(74) *Attorney, Agent, or Firm* — Ryan Christensen; Hashim Rahman

(57) ABSTRACT

The invention consists of devices, methods and systems for restraining, transporting and manipulating an animal, including lifting, rotating and tilting the animal using an animal lift with a vertically oriented track, a vertically moveable carriage contacting the vertically oriented track, a pivot assembly connected to the vertically movable carriage, and a crate attachment assembly rotatably connected to the pivot assembly.

13 Claims, 8 Drawing Sheets

(56) References Cited

U.S. PATENT DOCUMENTS

| | | | | |
|---|---|---|---|---|
| 5,441,016 | A | 8/1995 | Ricketts | |
| 5,738,045 | A | 4/1998 | Bleacher | |
| 5,820,270 | A * | 10/1998 | Richardson | B66F 9/125<br>384/275 |
| 6,477,986 | B1 | 11/2002 | Korjenic | |
| 8,051,807 | B2 | 11/2011 | Winders | |
| 8,333,159 | B2 * | 12/2012 | Schroer | A61D 3/00<br>119/753 |
| 9,992,976 | B2 | 6/2018 | Funk | |
| 10,051,840 | B2 * | 8/2018 | Mollhagen | A61D 3/00 |
| 10,736,722 | B2 * | 8/2020 | Wolfsberger | A01K 15/00 |
| 10,828,215 | B2 * | 11/2020 | Guhel | A61G 7/08 |
| 2005/0241593 | A1 * | 11/2005 | Kaura | A01K 1/0088<br>119/496 |
| 2009/0183690 | A1 | 7/2009 | Winders | |
| 2010/0166531 | A1 * | 7/2010 | Bauer | B66F 9/183<br>414/429 |
| 2010/0323589 | A1 * | 12/2010 | Schellenberg | B24B 41/02<br>451/259 |
| 2012/0107040 | A1 * | 5/2012 | Genter | B65D 88/56<br>403/322.3 |
| 2015/0030422 | A1 * | 1/2015 | Karlsson | B66F 9/186<br>414/620 |
| 2015/0328687 | A1 * | 11/2015 | Amaya | B23Q 15/08<br>82/148 |
| 2016/0106060 | A1 * | 4/2016 | Sundwall | A01K 1/0613<br>119/453 |
| 2017/0151491 | A1 * | 6/2017 | Collins | B23P 19/04 |
| 2018/0354761 | A1 * | 12/2018 | Addicott | B66F 9/146 |
| 2021/0395059 | A1 * | 12/2021 | Schöttke | B66F 9/22 |

FOREIGN PATENT DOCUMENTS

| | | | | |
|---|---|---|---|---|
| KR | 100440038 | B1 * | 7/2004 | B66F 9/16 |
| KR | 20190064002 | A * | 6/2019 | |
| WO | WO-9721342 | A1 * | 6/1997 | A01K 1/0613 |
| WO | WO-2016137477 | A1 * | 9/2016 | B65G 7/08 |
| WO | WO-2017197494 | A1 * | 11/2017 | A01K 1/0035 |
| WO | WO-2021162156 | A1 * | 8/2021 | |

* cited by examiner 60
65
64
66
71
71
71
69
69
70
82
62
63
72
72
67
67
61
81
80
68
66

DEVICES, METHODS AND SYSTEMS FOR RESTRAINING, TRANSPORTING AND MANIPULATING ANIMALS

REFERENCE TO RELATED APPLICATIONS

This application claims the benefit of U.S. Provisional Patent Application No. 63/290,951 filed Dec. 17, 2021, the entire disclosure of which is incorporated herein by reference.

BACKGROUND OF THE INVENTION

In the animal care and husbandry fields, there is a need to restrain, transport and manipulate large animals such as livestock in order to carry out on site health maintenance and treatment tasks. With respect to livestock, it is generally difficult to safely and quickly move an animal between locations within a facility, such as between a pen or barn and a treatment facility. Additionally assessing the health of a large animal and performing health maintenance tasks and medical procedures often requires significant manpower to restrain and manipulate the animal and/or the use of sedatives or anesthetics. In some livestock, such as swine, these difficulties may contribute to inadequate monitoring of animal health, which could result in a failure to identify and treat sick or diseased animals or to prevent disease before it occurs. Accordingly, there is a need in the animal care and husbandry fields to safely and efficaciously restrain, transport and manipulate large animals such as livestock.

SUMMARY OF THE INVENTION

In one embodiment, the invention encompasses an animal lift comprising a vertically oriented track; a vertically moveable carriage contacting the vertically oriented track; a pivot assembly connected to the vertically movable carriage, wherein the pivot assembly comprises a member having a proximal end pivotally connected to the vertically movable carriage and a distal end angularly displaceable from the vertically movable carriage; and a crate attachment assembly rotatably connected to the pivot assembly. In a particular embodiment of the invention, the crate attachment assembly is vertically tiltable relative to the carriage. In a further embodiment, the distal end of the pivot assembly is movable from a first position to a range of additional positions by angular displacement. In another embodiment, the distal end of the pivot assembly comprises a first portion of a latch mechanism and the carriage further comprises a second portion of the latch mechanism and wherein the latch mechanism reversibly latches the angularly displaceable portion of the pivot assembly to the carriage. In a particular embodiment, the crate attachment assembly comprises one or more lifting arms and is rotatable about an axis and angularly displaceable about the proximal end of the pivot assembly. In a further embodiment, the crate attachment assembly is connected to the pivot assembly using a slewing bearing, wherein the slewing bearing provides the rotational axis. In a certain embodiment, the animal lift is further comprised of a lifting mechanism for vertically displacing the carriage. In a more particular embodiment, the lifting mechanism is comprised of a ball screw drive, and in an even more particular embodiment, the ball screw drive is comprised of a brake and in an even more particular embodiment, the ball screw drive is comprised of a rotary encoder. In yet another embodiment, the animal lift is further comprised of a ratchet mechanism connected to the carriage. In an even more particular embodiment, the animal lift is comprised of a ratchet release solenoid.

Another aspect of the invention encompasses an animal crate comprising a top frame; a cradle connected to the top frame, wherein the cradle has a surface for engaging the dorsum or spine of an animal along the animal's longitudinal axis from head to tail; and a bottom assembly comprising a horizontal support member having a surface for engaging the sternum or underbelly of the animal along the animal's longitudinal axis from head to tail, wherein the bottom assembly is vertically movable relative to the top frame. In another embodiment, the animal crate is further comprised of a side door or side wall connected to the top frame. In an yet another embodiment, the animal crate is further comprised of one or more caster wheels coupled to i) the top frame or ii) the side door or side wall. In a certain embodiment, the animal crated is also comprised of a vertically oriented linear actuator connected to the top frame and the bottom assembly, and in a more specific embodiment, the animal crate is also comprised of a battery electrically connected to the linear actuator. In a particular embodiment of the animal crate, the top frame of the animal crate is comprised of vertically oriented struts, and in another embodiment, the bottom assembly is further comprised of one or more foot slides connected to the horizontal support member. In some embodiments, the vertically oriented linear actuators connect the vertically oriented struts to the one or more foot slides. In another embodiment, the vertically oriented linear actuators are operable between a first position in which the one or more foot slides contact the ground and a second position in which the caster wheels contact the ground, and in yet another embodiment, the top frame is comprised of one or more horizontally oriented channels for receiving lifting arms for suspending the animal crate. In a particular embodiment, the animal crate is further comprised of a head support connected to the top frame, and in another embodiment, the animal crate is comprised of a caster wheel coupled to the top frame. In certain embodiments, the vertically oriented track is comprised of a surface of an I-beam.

A third aspect of the invention encompasses an animal care system comprising an animal lift comprising i) a vertically oriented track; ii) a vertically moveable carriage contacting the vertically oriented track; iii) a pivot assembly connected to the vertically movable carriage, wherein the pivot assembly comprises a member having a proximal end pivotally connected to the vertically movable carriage and a distal end angularly displaceable from the vertically movable carriage; and iv) a crate attachment assembly rotatably connected to the pivot assembly; and an animal crate comprising i) a top frame; ii) a cradle connected to the top frame, wherein the cradle has a surface for engaging the dorsum or spine of an animal along the animal's longitudinal axis from head to tail; and iii) a bottom assembly comprising a horizontal support member having a surface for engaging the sternum or underbelly of the animal along the animal's longitudinal axis from head to tail, wherein the bottom assembly is vertically movable relative to the top frame.

Another aspect of the invention encompasses a method of manipulating an animal comprising a) providing a quadruped animal; b) positioning the animal within an animal crate comprising i) a cradle having a surface for engaging the dorsum or spine of the animal along the animal's longitudinal axis from head to tail and ii) a horizontal support member having a surface for engaging the sternum or underbelly of the animal along the animal's longitudinal axis from head to tail; c) raising the horizontal support member a vertical distance within the animal crate to contact and suspend the positioned animal; and d) rotating the animal crate 180 degrees along its longitudinal axis, thereby rotating the suspended animal 180 degrees along its longitudinal axis from head to tail and engaging the animal's dorsum or spine with the cradle. In a further embodiment, the method of manipulating the animal is further comprised of tilting the rotated animal crate along its longitudinal axis, thereby tilting the rotated animal along its longitudinal axis from head to tail. In a specific embodiment, the quadruped animal is a suid or a bovid.

DETAILED DESCRIPTION OF THE INVENTION

Figure 1:
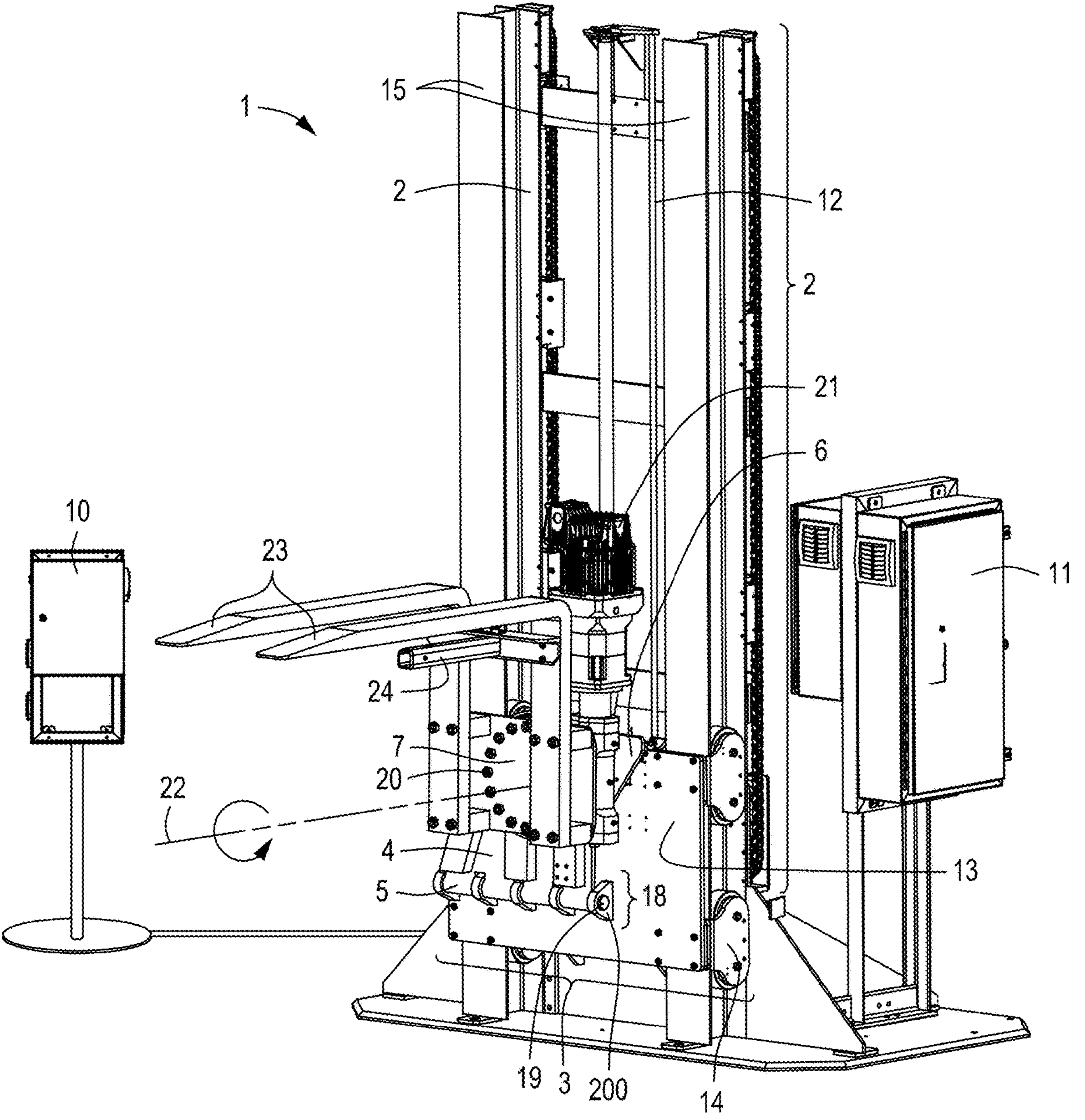
FIG. 1 is a depiction of one embodiment of an animal lift of the invention.

FIG. 1 depicts one embodiment of an animal lift 1. The animal lift 1 as depicted shows a vertically oriented track 2, a vertically moveable carriage 3 contacting the vertically oriented track 2 and a pivot assembly 4 connected to the vertically moveable carriage 3 and a crate attachment assembly 7 that is rotatably connected to the pivot assembly 4. Also as shown in FIG. 1, the pivot assembly 4 is comprised of a proximal end 5 pivotally connected to the vertically moveable carriage 3 and a distal end 6 that is angularly displaceable from the vertically moveable carriage 3. This embodiment of the invention is also comprised of a lifting mechanism 9 (shown in FIG. 2), a control panel 10 for controlling movement of the carriage 3 and rotation of the crate attachment assembly 7, and an electrical panel 11 for distributing electricity to various components of the animal lift 1, including but not limited to the lifting mechanism 9 and control panel 10. Optionally, the animal lift 1 may include an emergency stop switch mounting shaft 12 upon which one or more mechanical switches or sensors may be mounted. Such mechanical switches or sensors may be configured to stop the movement of the carriage 3 once the carriage 3 reaches a desired position along the emergency stop switch mounting shaft 12.

Figure 2:
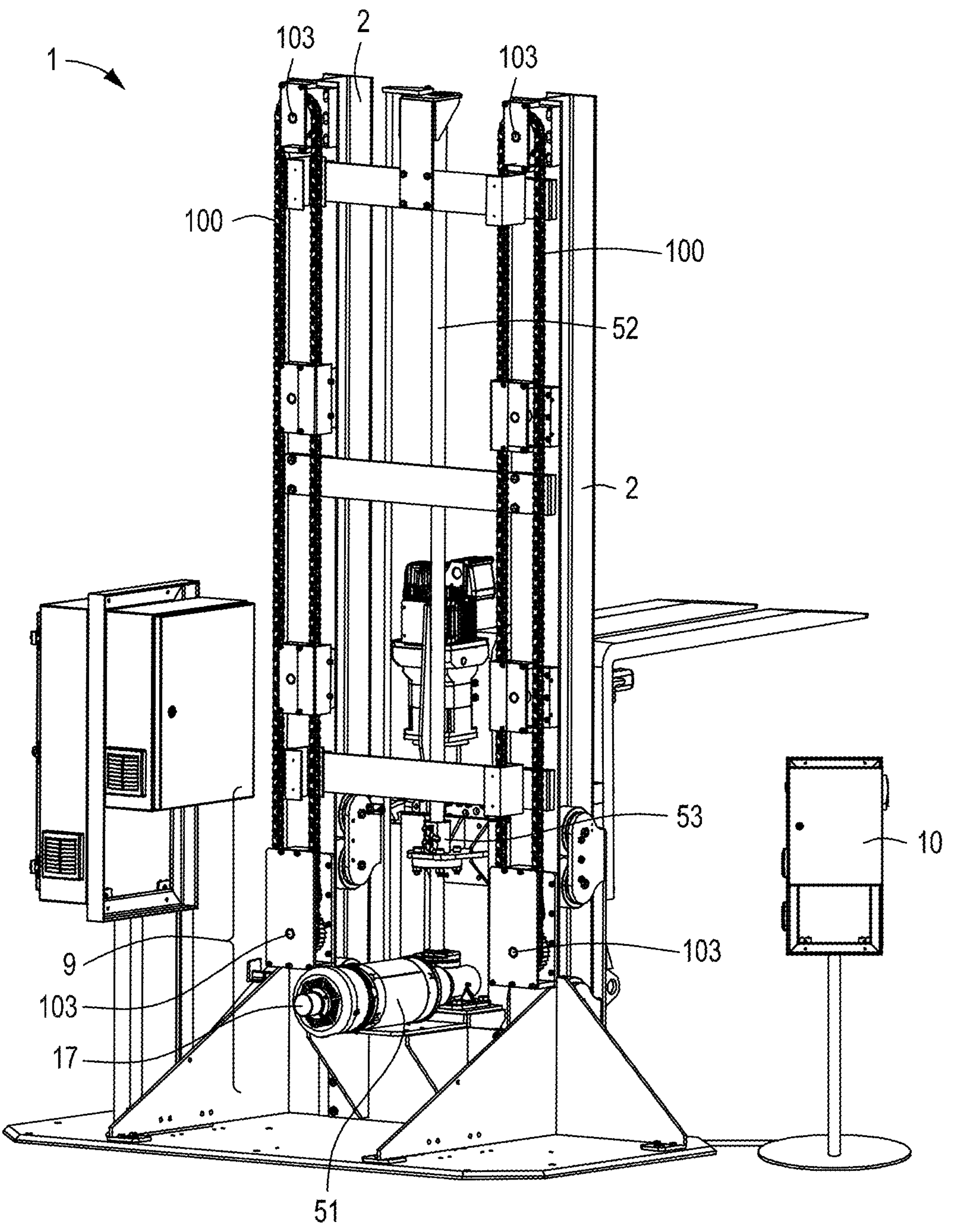
FIG. 2 is an alternate view of one embodiment of an animal lift of the invention.
Figure 3:
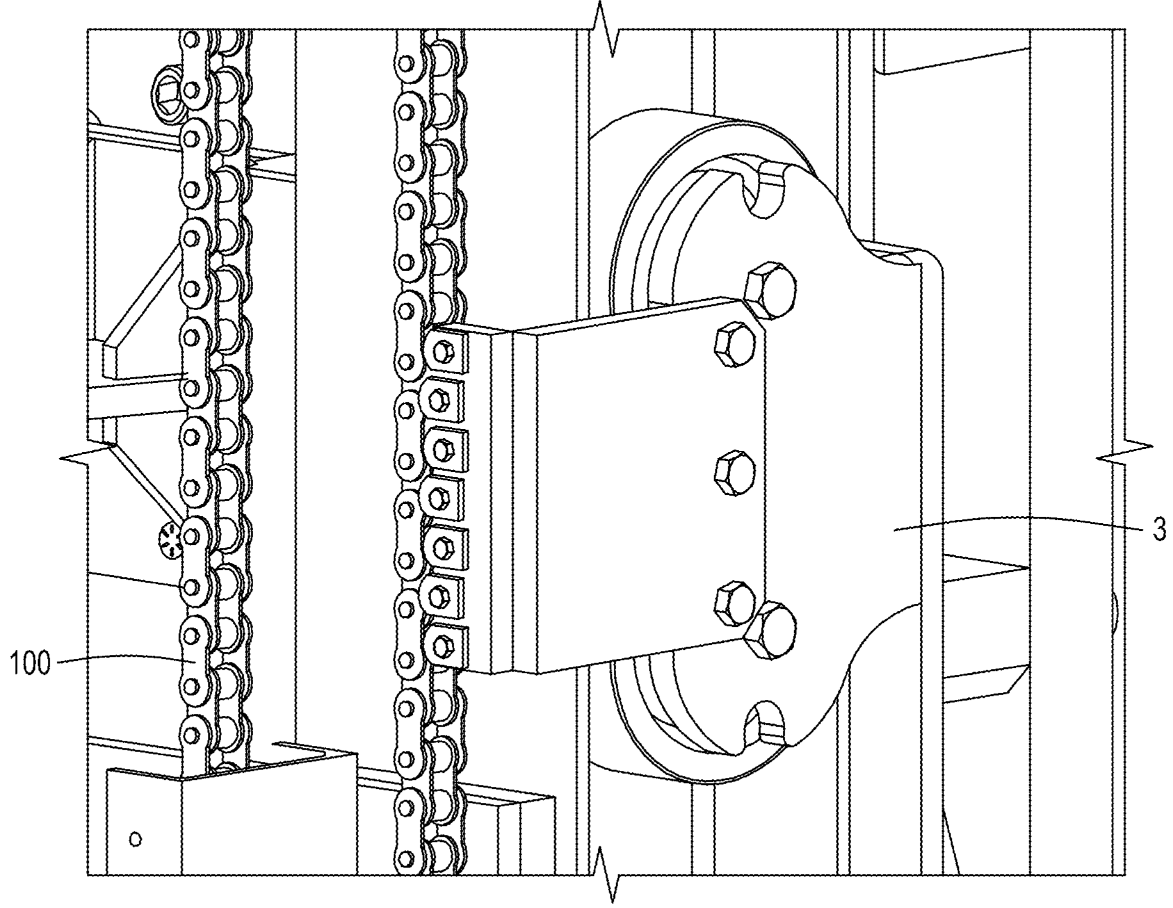
FIG. 3 shows a carriage attached to a chain of an animal lift of the invention.

In certain embodiments of the invention, the vertically moveable carriage 3, to which the pivot assembly 4 is connected, is comprised of a plate 13 to which one or more carriage wheels 14 are coupled. The one or more carriage wheels 14 contact a surface of vertically oriented track 2, which serves to guide the carriage 3 as the carriage 3 moves vertically. Any suitable attachment device or method known in the art may be used to connect the pivot assembly 4 to the carriage 3, including but not limited to the use of bolts or by welding. As shown in FIG. 2, in a particular embodiment, animal lift 1 is further comprised of chains 100 and one or more ratchets (not shown). Chains 100 directly or indirectly mechanically interface with the one or more ratchets. Chains 100 substantially run the length of vertically oriented tracks 2 and are attached to animal lift 1 via pulleys 103. In this embodiment, the one or more ratchets prevent carriage 3 from moving lower until the one or more ratchets are released. As shown in FIG. 3, in this embodiment, carriage 3 is connected to chain 100. Optionally, animal lift 1 can further comprise one or more ratchet release solenoids (not shown) that can be connected to control panel 10, thereby allowing a user to release the one or more ratchets and carriage 3 to be lowered.

In certain embodiments of the invention, vertically oriented track 2 is comprised of a surface of an I-beam 15. In an alternative embodiment (not shown) vertically oriented track 2 is comprised of a surface of a C-channel member. Generally, carriage wheels 14 are slidably nestled within the channel created by the flanges of I-beam 15 or a C-channel member. FIG. 1 shows one embodiment in which the animal lift 1 is comprised of two I-beams 15 that are vertically oriented and run parallel to one another. Carriage 3 spans between the two I-beams 15 and one set of carriage wheels 14 is nestled within a channel formed by each I-beam 15.

As shown in FIG. 2, which is an alternate view of the animal lift depicted in FIG. 1, lifting mechanism 9 is comprised of a ball screw drive, which is in turn comprised of a servo motor 51, threaded shaft 52 and ball nut 53. As shown, threaded shaft 52 is vertically oriented and is parallel to vertically oriented track 2. Also as shown, ball nut 53 is attached to carriage 3 and is threaded over threaded shaft 52. Servo motor 51 is coupled to, or otherwise mechanically connected to, threaded shaft 52, so as to impart rotational motion of threaded shaft 52 when servo motor 51 is activated. Rotational motion of threaded shaft 52 in turn imparts linear motion of carriage 3 via ball nut 53. In certain embodiments of the invention, ball screw drive is further comprised of a rotary encoder 17, which tracks the position of servo motor 51. The ball screw drive may further be comprised of a brake (not shown), which prevents servo motor 51 from imparting rotational motion of threaded shaft 52. As can be understood by one of ordinary skill in the art, any suitable lifting mechanism may be used to impart linear motion of carriage 3 in other embodiments of the invention. Examples of alternate lifting mechanisms suitable for use in the invention, such as a hydraulic lifting mechanism, are disclosed in U.S. Pat. No. 9,992,976, which is incorporated by reference herein.

Referring again to FIG. 1, pivot assembly 4 is connected to the vertically moveable carriage 3. In this embodiment of the invention, pivot assembly 4 is comprised of a proximal end 5, which is pivotally connected to the vertically moveable carriage 3, and a distal end 6 that is angularly displaceable from the vertically moveable carriage 3. As shown, pivot assembly 4 is pivotally connected to carriage 3 via hinge 18. Hinge 18 is further comprised of hinge pin 19, which holds together hinge 18. Proximal end 5 comprises one arm of hinge 18, while flange 200 of plate 13 comprises the other arm of hinge 18. As such, distal end 6 of pivot assembly 4 is able to be angularly displaced relative to plate 13.

As shown in FIG. 1, crate attachment assembly 7 is rotatably connected to pivot assembly 4 via a slewing bearing (not shown). Generally, a slewing bearing is comprised of two concentric rings, one comprising an inner ball race while the other comprising an outer ball race, and a plurality of rolling elements or balls between the two. One of the rings comprises a gear, which allows one ring to move while the other stays in place. As depicted in FIG. 1, the slewing bearing is bolted to crate attachment assembly 7 via a plurality of bolts 20. Motor 21 rotates one of the rings of the slewing bearing via a worm gear (not shown), thereby imparting rotational movement of crate attachment assembly 7 around rotational axis 22 created by the slewing bearing. Crate attachment assembly 7 is further comprised one or more lifting arms 23, which interface with an object such as an animal crate. Once lifting arms 23 are engaged with an object, animal lift 1 is able to raise the object by the vertical movement of carriage 3, tilt the object by the angular displacement of the distal end 6 of pivot assembly 4, and rotate the object by the rotational movement of crate attachment assembly 7. As depicted in FIG. 1, crate attachment assembly 7 is further comprised of a proximity sensor 24. In certain embodiments, proximity sensor 24 is configured to alert a user that lifting arms 23 have fully engaged an object via an audible alert or a visual alert. In a particular embodiment, proximity sensor 24 is configured to detect full engagement of lifting arms 23 with an object and to automatically commence a lifting, tilting and/or rotating routine.

Figure 4:
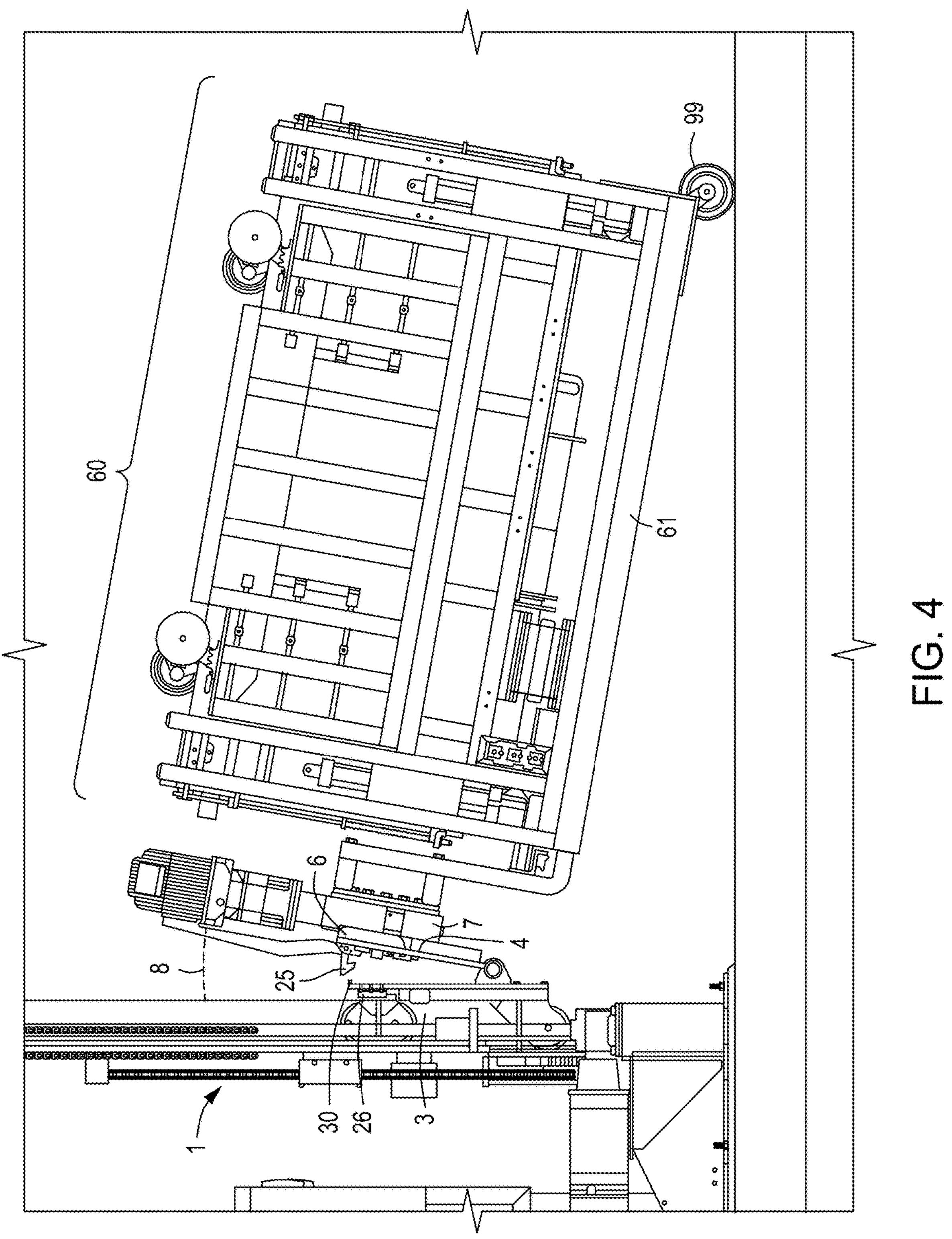
FIG. 4 shows an animal care system of the invention in which an animal crate is tilted relative to the ground.

Referring to FIG. 4, in certain embodiments, the crate attachment assembly 7 is vertically tiltable relative to the carriage 3. In particular, the distal end 6 of the pivot assembly 4, to which the crate attachment assembly 7 is attached, is moveable from a first position through a continuous range of additional positions, thereby allowing a user to tilt the crate attachment assembly 7 relative to the carriage 3 to a desired angle 8. In certain embodiments of the invention, the desired angle 8 may correspond to an animal within attached animal crate 60 achieving the Trendelenburg position, which is typically achieved when a supine animal is tilted to achieve a 15 to 30 degree incline relative to the floor, with the animal's posterior feet above its head. Also as shown in FIG. 4, the distal end 6 of pivot assembly 4 comprises a first portion 25 of a latch mechanism, which reversibly engages a second portion 26 of the latch mechanism on the carriage 3.

Figure 5:
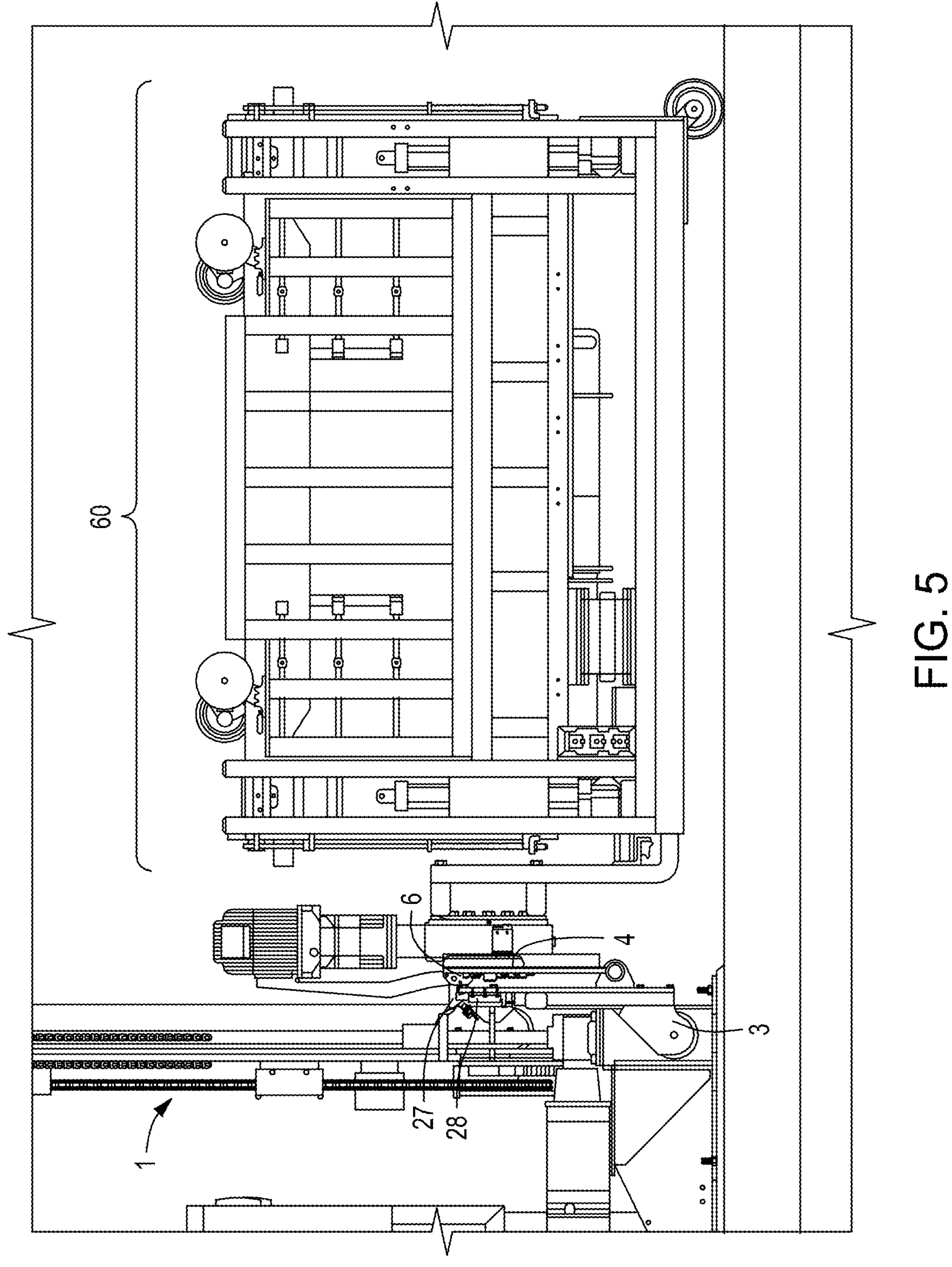
FIG. 5 shows an animal care system of the invention in which an animal crate is level with the ground.

As shown in FIG. 5, when a first portion of the latch mechanism (which in this particular embodiment constitutes latch arm 27) and a second portion of the latch mechanism (which in this particular embodiment constitutes space 28 for receiving latch arm 27) are fully engaged with one another, the distal end 6 of pivot assembly 4 is prevented by the latch mechanism from being angularly displaced away from carriage 3.

Figure 6:
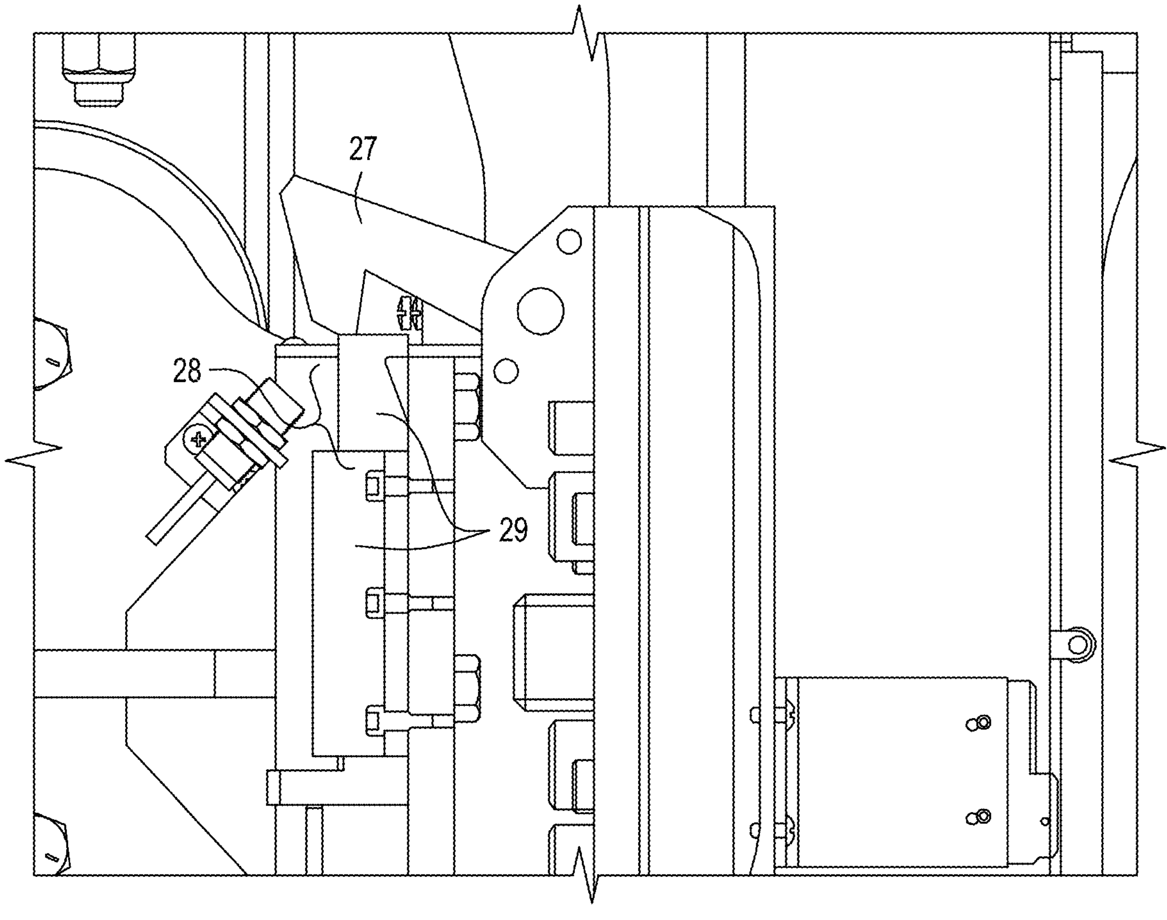
FIG. 6 shows a latch mechanism between a pivot assembly and carriage.

Referring to FIG. 6, in a more particular embodiment, the latch mechanism is further comprised of one or more latch release solenoids 29 for displacing latch arm 27 out of space 28. As shown in FIG. 4, in certain embodiments, the latch mechanism is also comprised of a tilt sensing switch 30, which is configured to trigger the latch release solenoids 29 when a desired tilt angle is achieved. As shown, tilt sensing switch 30 is mounted to carriage 3.

In one embodiment of the invention, in order to tilt an animal crate 60 using animal lift 1, the latch mechanism can be disengaged to unlock pivot assembly 4 from carriage 3 as follows. Animal crate 60 is reversibly connected with animal lift 1 through lifting arms 23. Animal crate 60 is raised by animal lift 1 and then inverted by rotation about its longitudinal axis. Once inverted, animal crate 60 is lowered so that its top-mounted wheels are resting on the ground. Carriage 3 is then moved slightly downward by approximately 1 inch (not shown), which causes the pivot assembly 4 to tilt towards vertically oriented tracks 2 and to contact tilt sensing switch 30. Activation of tilt sensing switch 30 in turn activates latch release solenoid 29, which displaces latch arm 27 out of space 28. Pivot assembly 4 is now unlocked from carriage 3, and as carriage 3 is moved vertically upward, the angle between animal crate 60 and the ground increases. Any angle between 0 to 80 degrees (between animal crate 60 the ground) can be achieved by vertical adjustment of the position of carriage 3.

Figure 7:
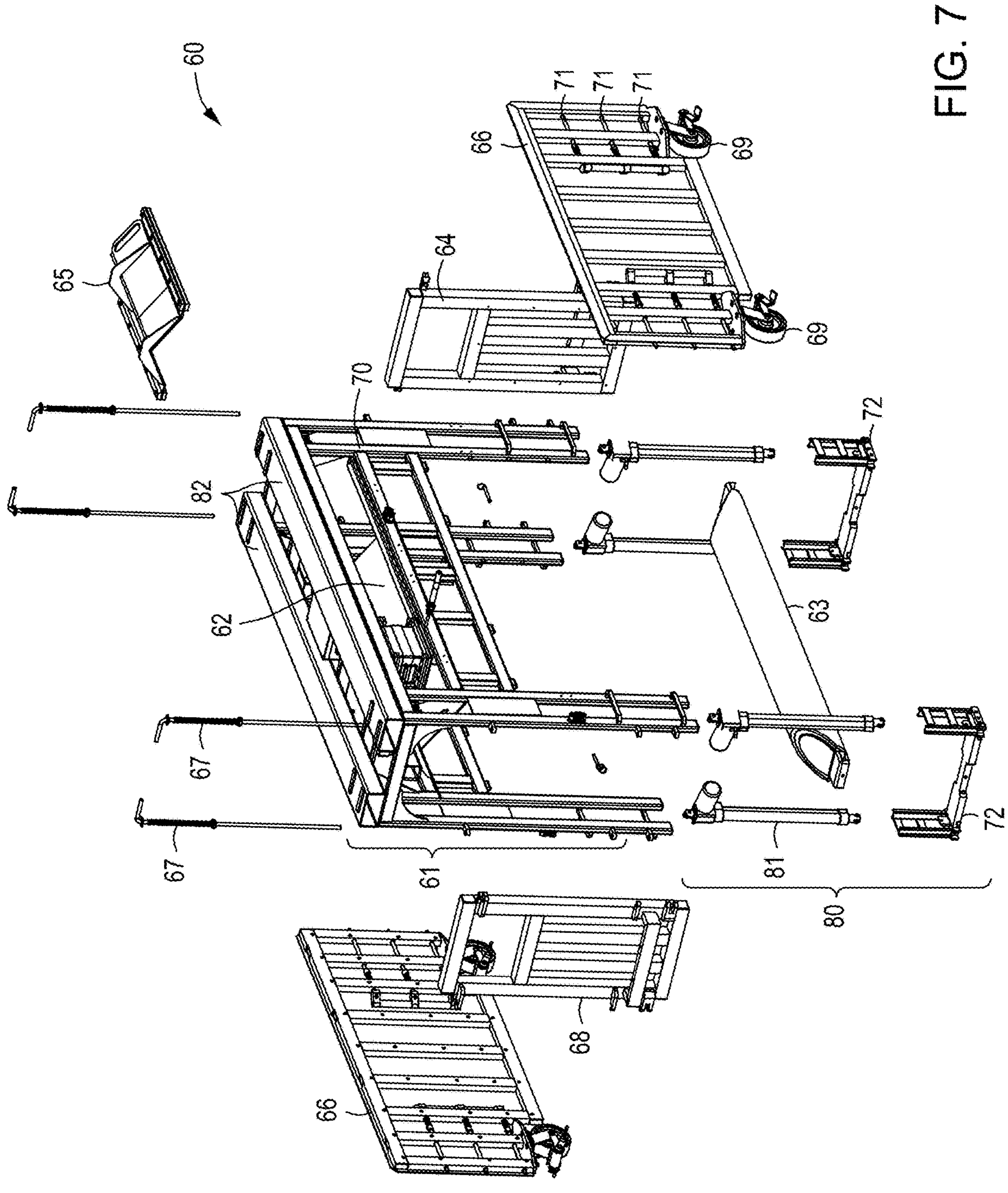
FIG. 7 is an exploded view of an animal crate of the invention.

Referring to FIG. 5, an animal crate 60 may be used in conjunction with animal lift 1 as part of an animal care system, or separately. As shown in FIG. 7, which is an exploded view of animal crate 60, animal crate 60 is comprised of a top frame 61 and a cradle 62 connected to the top frame 61, which has a surface for engaging the dorsum or spine of an animal along the animal's longitudinal axis from head to tail when animal crate 60 is rotated along its longitudinal axis. In addition to cradle 62, animal crate 60 is further comprised of a slidable head support 65, which slides into the top frame 61. Top frame 61 is comprised of a plurality of vertical struts 70. Animal crate 60 is further comprised of a front door 64, a rear door 68 and two side doors 66. Front door 64 (which is on the same end of animal crate 60 as head support 65) and rear door 68 are attached to top frame 61 using removable door hinge rods 67. Caster wheels 69 are coupled to side doors 66. Side doors 66 are comprised of locking rods 71, which are under spring tension and whose exposed ends 71 interface with vertical struts 70 to keep side doors 66 attached to top frame 61. Animal crate 60 is further comprised of a bottom assembly 80 comprising a horizontal support member 63 having a surface for engaging the sternum or underbelly of the animal along the animal's longitudinal axis from head to tail and foot slides 72. Notably, bottom assembly 80 is vertically movable relative to the top frame 61. This is accomplished by connecting top frame 61 to bottom assembly 80 using vertically oriented linear actuators 81. Linear actuators 81 are connected to top frame 61 and foot slides 72 of bottom assembly 80. Horizontal support member 63 is also connected to and supported by foot slides 72. When a user needs to move animal crate 60, animal crate 60 contacts the ground via caster wheels 69, which are mounted to side doors 66, and foot slides 72 are off of the ground. When the user wishes to load an animal into animal crate 60, linear actuators 81 can be extended, which displaces foot slides 72 downward to make contact with the ground and lifts caster wheels 69 off of the ground, thereby preventing the animal from moving animal crate 60 once loaded inside. Thereafter, the user can contract linear actuators 81 to lift foot slides 72 off of the ground, thereby causing caster wheels 69 to contact the ground. The user can continue to contract linear actuators 81 so that the horizontal support member 63 contacts the under belly of the animal and lifts the animal's feet off of the ground. Once the animal is suspended, the user can move animal crate 60 to a desired location and then unload the animal by reversing the above procedure. As shown in FIG. 7, top frame 61 is also comprised of one or more horizontally oriented channels 82 for receiving lifting arms 23. Optionally, as shown in FIG. 4, top frame 61 can further comprise a wheel 99, which allows animal crate 60 to be rolled after it has been inverted by rotation along its longitudinal axis.

Figure 8:
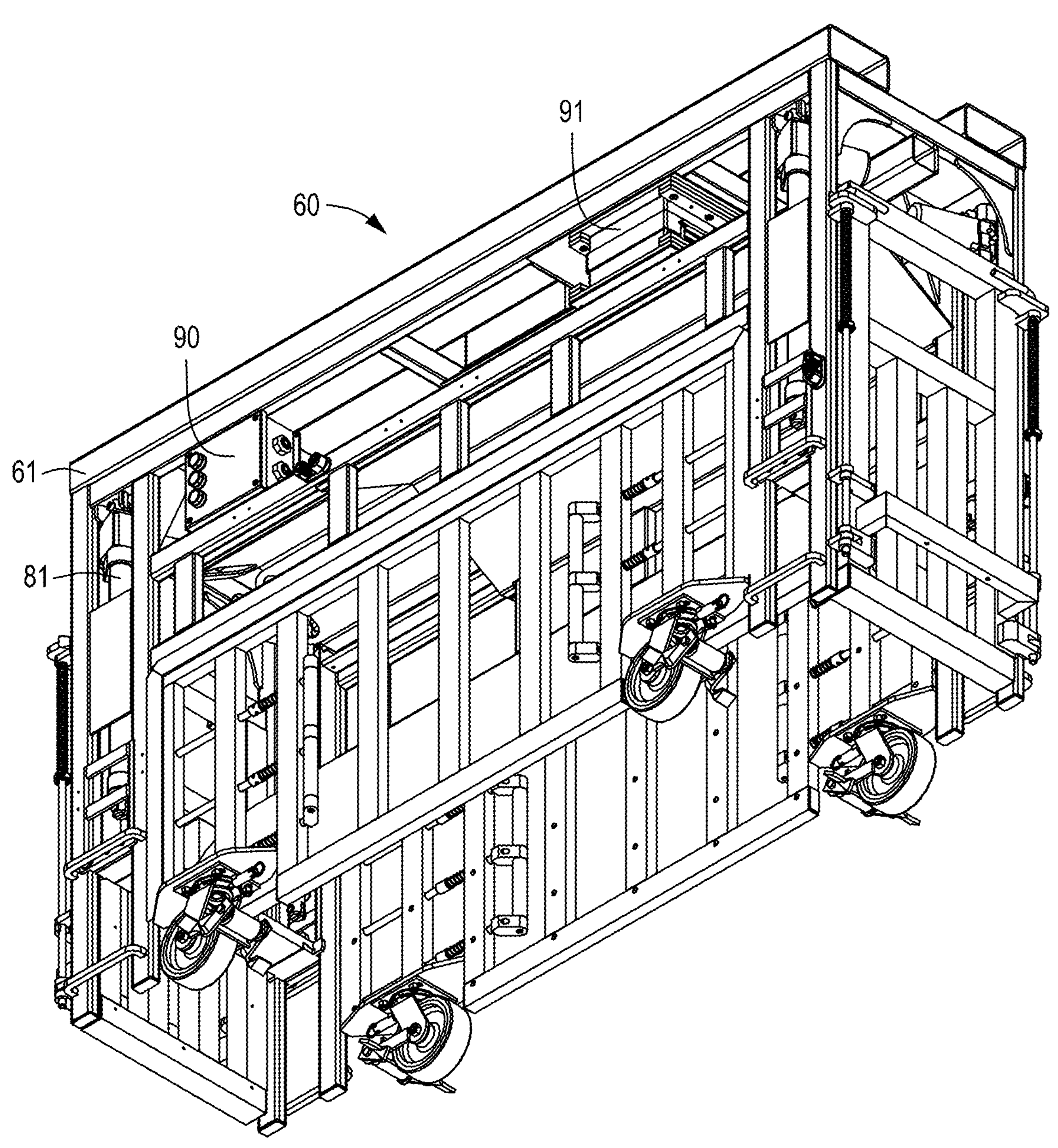
FIG. 8 is a depiction of an assembled animal crate of the invention.

Referring to FIG. 8, which shows an assembled animal crate 60, top frame 61 houses an actuator control panel 90 and battery pack 91. Battery pack 91 is electrically connected to linear actuators 81 and actuator control panel 90. In some embodiments of the invention, battery pack 91 is a 24-volt battery pack. Actuator control panel 90 is also electrically connected to linear actuators 81 and allows a user to control extension and contraction of linear actuators 81 as desired.

In certain embodiments of the invention, the animal lift 1 and animal crate 60, and their components, are constructed substantially of metal, including but not limited to steel. In other embodiments of the invention, other types of metals, including but not limited to aluminum and titanium, can used to construct the components of animal lift 1 and animal crate 60, according to the necessary load bearing properties needed for a particular application and as appropriate according to one of ordinary skill in the art. Similarly other materials such as fiberglass and plastics can be utilized in construction of certain components of the invention, as appropriate according to one of ordinary skill in the art.

An example of animal crate 60 used in conjunction with animal lift 1 as part of an animal care system is provided as follows. Either the front door 64 or rear door 68 of animal crate 60 is opened or removed. Linear actuators 81 are extended so that foot slides 72 contact the ground. A quadruped animal, such as a swine, is positioned within animal crate 60 so that its head is positioned below head support 65. Once the animal is in position inside animal crate 60, linear actuators 81 are contracted, thereby raising foot slides 72 off of the ground. Linear actuators 81 are then sufficiently further contracted so that horizontal support member 63 contacts the under belly of the animal, and the animal's feet are suspended off of the ground. Animal crate 60 can then be moved to the location of animal lift 1 by rolling. Animal crate 60 is then positioned so that lifting arms 23 of animal lift 1 are positioned within horizontally oriented channels 82 of animal crate 60. Proximity sensor 24 alert indicates that animal crate 60 is correctly positioned in relation to animal lift 1. Carriage 3 is then raised thereby raising animal crate 60 and the animal within to an appropriate height for the applicable examination or procedure. Crate attachment assembly 7 can then also be rotated 180 degrees, which supinates the animal and causes the animal's dorsum to engage with cradle 62, and the animal's head to engage with head support 65. If a procedure requires that the supine animal be placed at an angle relative the ground, carriage 3 can then be lowered and the above-described procedure for unlocking pivot assembly 4 from carriage 3 and tilting animal crate 60 is carried out.

Those of ordinary skill in the art will recognize that the invention described above includes many inventive embodiments and is not limited to any particular embodiment shown in the drawings.

What is claimed is:

1. An animal care system comprising:

an animal lift comprising i) a vertically oriented track;

ii) a vertically moveable carriage contacting the vertically oriented track;

iii) a pivot assembly pivotally connected to the vertically movable carriage through a hinge comprising a hinge pin, wherein the pivot assembly comprises a member having a proximal end pivotally connected to the vertically movable carriage and a distal end angularly displaceable from the vertically movable carriage;

iv) a crate attachment assembly rotatably connected to the pivot assembly using a slewing bearing about an axis of rotation provided by the slewing bearing, wherein the axis of rotation provided by the slewing bearing is perpendicular to the longitudinal axis of the hinge pin; and an animal crate comprising i) a top frame;

ii) a cradle connected to the top frame, wherein the cradle has a surface for engaging the dorsum or spine of an animal along the animal's longitudinal axis from head to tail; and iii) a bottom assembly comprising a horizontal support member having a surface for engaging the sternum or underbelly of the animal along the animal's longitudinal axis from head to tail, wherein the bottom assembly is vertically movable relative to the top frame.

2. The animal care system of claim 1, wherein the crate attachment assembly is vertically tiltable relative to the carriage.

3. The animal care system of claim 1, wherein the distal end of the pivot assembly is movable from a first position to a range of additional positions by angular displacement.

4. The animal care system of claim 1, wherein the distal end of the pivot assembly comprises a first portion of a latch mechanism and the carriage further comprises a second portion of the latch mechanism and wherein the latch mechanism reversibly latches the angularly displaceable distal end of the pivot assembly to the carriage.

5. The animal care system of claim 1, wherein the crate attachment assembly comprises one or more lifting arms.

6. The animal care system of claim 5, wherein the crate attachment assembly is angularly displaceable about the proximal end of the pivot assembly and further comprises a proximity sensor.

7. The animal care system of claim 1, wherein the animal lift further comprises a lifting mechanism for vertically displacing the carriage.

8. The animal care system of claim 7, wherein the lifting mechanism comprises a ball screw drive.

9. The animal care system of claim 8, wherein the ball screw drive comprises a brake.

10. The animal care system of claim 8, wherein the ball screw drive comprises a rotary encoder.

11. The animal care system of claim 1, wherein the animal lift further comprises a ratchet mechanism connected to the carriage.

12. The animal care system of claim 11, wherein the animal lift further comprises a ratchet release solenoid.

13. The animal care system of claim 1, wherein the vertically oriented track is comprised of a surface of an I-beam.

* * * * *